United States Patent
Moriwaki et al.

(10) Patent No.: US 7,894,723 B2
(45) Date of Patent: Feb. 22, 2011

(54) OPTICAL TRANSMISSION CONTROL CIRCUIT

(75) Inventors: Shohei Moriwaki, Tokyo (JP); Tetuhiro Fukao, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 645 days.

(21) Appl. No.: 11/934,833

(22) Filed: Nov. 5, 2007

(65) Prior Publication Data

US 2008/0205902 A1 Aug. 28, 2008

(30) Foreign Application Priority Data

Feb. 28, 2007 (JP) .................... P2007-048902

(51) Int. Cl.
H04B 10/00 (2006.01)

(52) U.S. Cl. .................. 398/135; 398/182; 398/136; 398/25; 398/33; 398/137; 398/138; 398/22; 398/23; 385/89; 385/90; 385/92; 385/93; 372/32; 372/34; 372/36; 372/38.02

(58) Field of Classification Search ................ 398/135, 398/136, 137, 138, 139, 164, 22, 23, 24, 398/25, 26, 27, 38, 182, 183, 202, 208, 209, 398/33, 192, 195, 196, 197, 198, 158, 159, 398/17; 385/88, 89, 90, 92, 93; 372/32, 372/34, 36, 38.02

See application file for complete search history.

(56) References Cited

U.S. PATENT DOCUMENTS

| | | | |
|---|---|---|---|
| 5,019,769 A | 5/1991 | Levinson | |
| 5,119,222 A | 6/1992 | Hara et al. | |
| 6,195,370 B1 | 2/2001 | Haneda et al. | |
| 7,050,720 B2 | 5/2006 | Aronson et al. | |
| 7,058,310 B2 | 6/2006 | Aronson et al. | |
| 7,079,775 B2 | 7/2006 | Aronson et al. | |
| 7,149,430 B2 | 12/2006 | Hosking et al. | |
| 2004/0136708 A1* | 7/2004 | Woolf et al. | 398/22 |
| 2005/0031352 A1* | 2/2005 | Light et al. | 398/135 |
| 2005/0196111 A1 | 9/2005 | Burdick | |
| 2006/0110157 A1* | 5/2006 | Tritschler et al. | 398/22 |

FOREIGN PATENT DOCUMENTS

| | | | |
|---|---|---|---|
| JP | 58-137042 A | | 8/1983 |
| JP | 9-162811 A | | 6/1997 |
| JP | 11-213428 A | | 8/1999 |
| JP | 2000-278215 A | | 10/2000 |
| WO | WO 98/13958 A | | 4/1998 |
| WO | WO 98/13959 A | | 4/1998 |
| WO | WO 98/56089 A | | 12/1998 |
| WO | WO 99/14832 A | | 3/1999 |

* cited by examiner

Primary Examiner—Hanh Phan
(74) Attorney, Agent, or Firm—Leydig, Voit & Mayer, Ltd.

(57) ABSTRACT

An optical transmission control circuit includes: an analog input section which receives optical transmission states as an analog values; an A/D conversion section which converts the analog values into digital values; a value storage section which stores maximum value of the digital values provided by the A/D conversion section; an output register which outputs a value to a host apparatus; and a control section which controls the maximum value storage section to store the maximum value of the digital values therein and controls the output register to output the maximum value to the host apparatus.

20 Claims, 5 Drawing Sheets

OPTICAL TRANSMISSION CONTROL CIRCUIT

CROSS-REFERENCE TO RELATED APPLICATIONS

This application is based upon and claims the benefit of priority from Japanese Patent Application No. 2007-048902, filed Feb. 28, 2007, the entire contents of which are incorporated herein by reference.

BACKGROUND OF THE INVENTION

1. Field of the Invention

Aspects of the present invention relate to an optical transmission control circuit used with an optical communication module (OTR) and in particular to an optical transmission control circuit for storing digital diagnostic monitoring (DDM) information to provide stable optical communication performance and outputting necessary DDM information to a host apparatus.

2. Description of the Related Art

An optical transmission control circuit in a related art inputs a plurality of analog signals relating to DDM information of the optical transmission control circuit and becoming operating parameters, converts the analog signals into digital values, stores the digital values in a digital value storage section, makes a comparison between the digital value and a threshold value, and stores a flag value in a flag value storage section based on the comparison result. Accordingly, the host apparatus reads the flag value from the flag value storage section in the optical transmission control circuit through an interface circuit on a regular basis or according to an error notification as an interrupt from the optical transmission control circuit. The host apparatus further reads the digital value in response to the read result of the flag value. Accordingly, to investigate an anomaly occurring in the optical transmission control circuit, it is made possible for the host apparatus to first read the flag value and then read the digital value only about the important part; the monitor operation can be simplified (see JP-B-3822861)

SUMMARY OF THE INVENTION

The optical transmission control circuit in the related art is configured as described above and thus involves the following problems:

(1) In the optical transmission control circuit in the related art, the number of the digital values stored in the digital value storage section is one per operating parameter. Then, if the digital value indicates an anomaly, the optical transmission control circuit in the related art outputs an error notification to the host apparatus and stops updating the digital value. The reason is that the operating parameter value of the optical transmission control circuit (laser output value, temperature value, etc.,) vigorously moves up and down and that when the digital value after the error notification is placed in the threshold value range (which will be hereinafter referred to as normal value), if the normal value is stored in the digital value storage section, the host apparatus reads the stored normal value as the later digital value read operation and it becomes impossible to read the abnormal value causing the error. According to the above-described method, however, if the digital value further exceeds the digital value stored in the digital value storage section at the stage for the host apparatus to read the digital value of the optical transmission control circuit, the digital value exceeding the stored digital value is not stored in the digital value storage section as update and the most recent abnormal value is uncertain; this is a problem.

(2) Since the optical transmission control circuit in the related art incorporates the flag value storage section for storing the flag value, the storage capacity increases; this is a problem.

One aspect of the present invention is embodied to solve the problems as described above and it is an object of the invention to provide an optical transmission control circuit that can extract a digital value useful for a host computer. It is another object of the invention to provide an optical transmission control circuit that can reduce the storage capacity in the circuit.

According to an aspect of the present invention, there is provided an optical transmission control circuit including: an analog input section which inputs an optical transmission state as an analog value; an A/D conversion section which converts the analog value into a digital value; a value storage section which stores a maximum value of the digital value provided by the A/D conversion section; an output register which outputs a value to a host apparatus; and a control section which controls the maximum value storage section to store the maximum value of the digital value therein and controls the output register to outputs the maximum value to the host apparatus.

According to the above configuration, the analog input section inputs the optical transmission state as an analog value; the A/D conversion section converts the analog value into a digital value; the value storage section stores a maximum value of the digital value provided by the A/D conversion section; the output register outputs a value to the host apparatus; and the control section controls the value storages section to store maximum value of the digital value therein and controls the output register to outputs the maximum value to the host apparatus. Thus, after detecting the digital value crossing the threshold value and outputting an error notification to the host apparatus, if the optical transmission control circuit acquires the digital value crossing the digital value, it updates the maximum value, so that the host apparatus can read the digital value based on the updated maximum value.

DETAILED DESCRIPTION OF THE INVENTION

Embodiments of the invention will be discussed below.

First Embodiment

Figure 1:
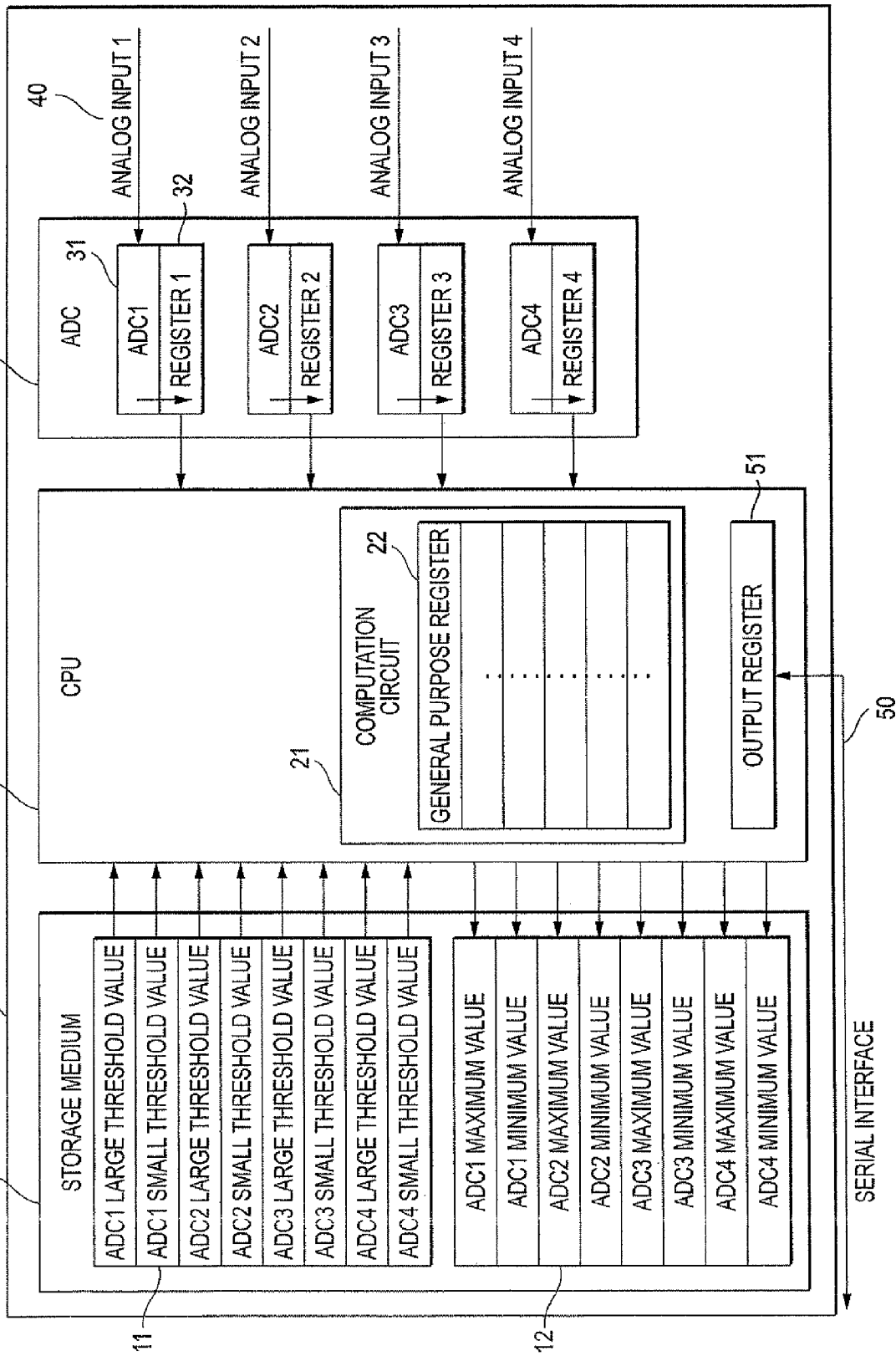
FIG. 1 is a block diagram of an optical transmission control circuit according to a first embodiment of the invention.
Figure 2:
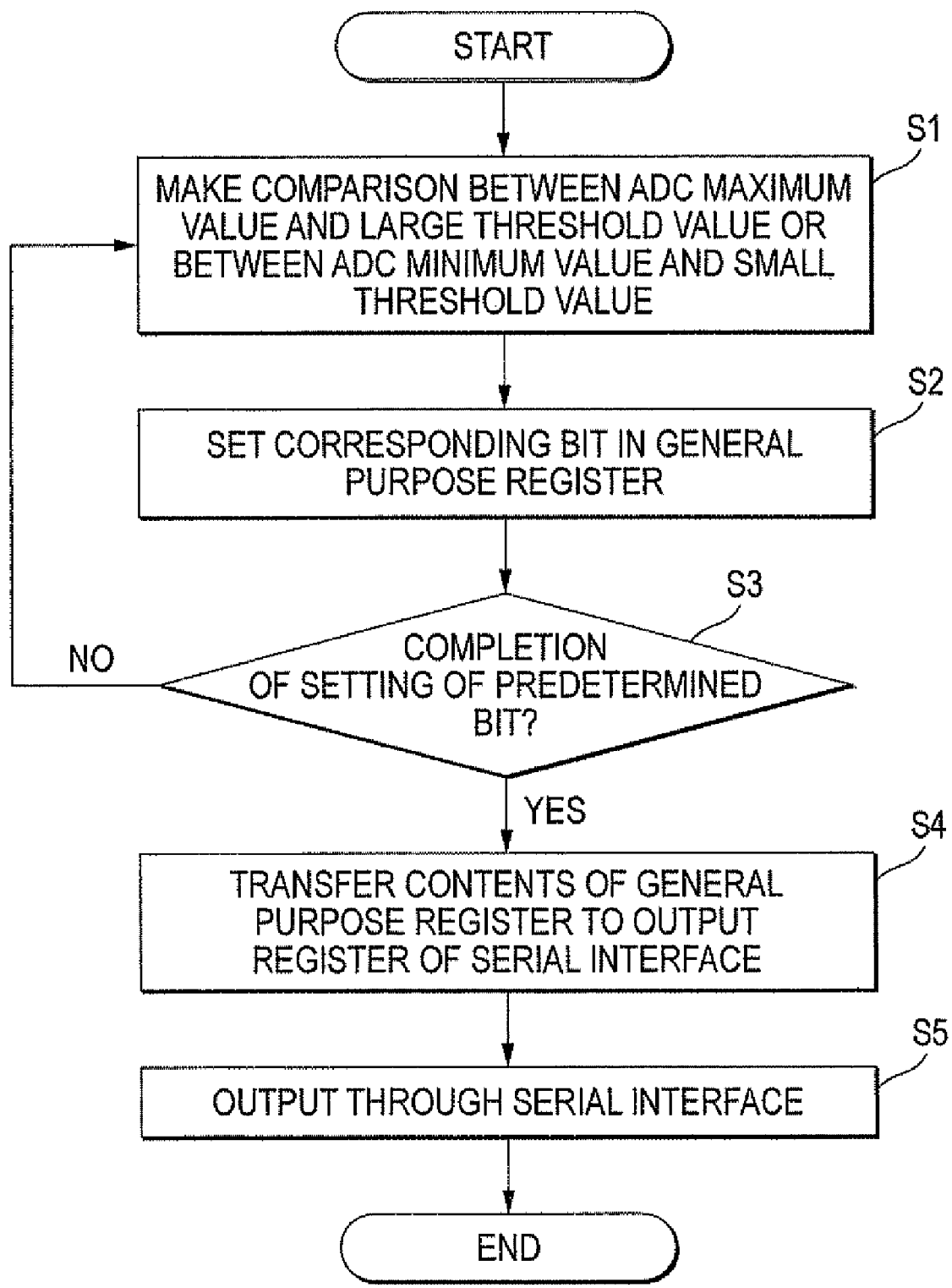
FIG. 2 is a flowchart of processing between a host apparatus and the optical transmission control circuit shown in FIG. 1.

FIG. 1 is a block diagram of an optical transmission control circuit according to a first embodiment of the invention, and FIG. 2 is a flowchart of processing between a host apparatus (not shown) and the optical transmission control circuit shown in FIG. 1. In the figure, numeral 1 denotes the optical transmission control circuit, numeral 10 denotes a storage section, numeral 11 denotes a threshold storage section for storing large threshold values and small threshold values, and numeral 12 denotes a maximum value/minimum value storage section for storing the maximum values/minimum values of digital values described later. Numeral 20 denotes a control section, numeral 21 denotes a computation circuit, and numeral 22 denotes a general purpose register of the computation circuit 21. Numeral 30 denotes an A/D conversion section, numeral 31 denotes an A/D conversion circuit, and numeral 32 denotes an A/D conversion result register to which the digital value after A/D conversion is output. Numeral 40 denotes an analog signal indicating an operating parameter of a laser output value, temperature value, etc., numeral 50 denotes a serial interface with the host apparatus and numeral 51 denotes an output register for outputting data to the host apparatus.

Next, the operation is as follows: The A/D conversion section 30 converts an input analog signal 40 into a digital value by the A/D conversion circuit 31 and outputs the digital value to the A/D conversion result register 32. On the other hand, the computation circuit 21 makes a comparison between the digital value in the A/D conversion result register 32 and the corresponding maximum value/minimum value in the maximum value/minimum value storage section 12 and updates the value in the maximum value/minimum value storage section 12 if the digital value is larger than or smaller than the maximum value/minimum value. The computation circuit 21 also makes a comparison between the digital value in the A/D conversion result register 32 and the corresponding large and small threshold values in the threshold storage section 11 and outputs an error signal as an interrupt to the host apparatus if the digital value crosses the threshold value. Accordingly, the host apparatus outputs an error check request for acquiring a flag indicating the error cause to the optical transmission control circuit 1. The optical transmission control circuit 1 in the invention continues the update operation still after outputting the error signal to the host apparatus.

Next, the flag output operation when an error check request is received from the host apparatus will be discussed based on FIG. 2. When the computation circuit 21 inputs an error check request from the host apparatus, it goes to S1 and compares a maximum value/minimum value in the maximum value/minimum value storage section 12 with the corresponding large threshold value/small threshold value in the threshold storage section 11. Next, the computation circuit 21 goes to S2 and sets the comparison result in a predetermined bit of the general purpose register 22 as a flag. Specifically, if the maximum value crosses the large threshold value, the computation circuit 21 sets the bit to "1" indicating a large side anomaly; if the maximum value does not cross the large threshold value, the computation circuit 21 sets the bit to "0" indicating large side normality. If the minimum value crosses the small threshold value, the computation circuit 21 sets the bit to "1" indicating a small side anomaly; if the minimum value does not cross the small threshold value, the computation circuit 21 sets the bit to "0" indicating small side normality and then goes to S3.

Next, at S3, the computation circuit 21 checks whether or not setting of the predetermined flag based on the error check request in the general purpose register 22 is complete. If the setting is complete, the computation circuit 21 goes to S4; otherwise, the computation circuit 21 goes to S1 and sets another flag at S3 and S2. At S4, the computation circuit 21 transfers the contents of the general purpose register 22 where the flag setting is complete to the output register 51. At S5, the computation circuit 21 outputs the contents of the output register 51 to the host apparatus according to a serial interface procedure.

As the above-described operation is performed, the host apparatus inputs the flag set in the output register 51 and analyzes the contents. Then, through the serial interface 50, the host apparatus requests the optical transmission control circuit 1 to send the digital value corresponding to the flag indicating an anomaly according to the flag contents. Accordingly, the computation circuit 21 extracts the digital value requested by the host apparatus from the maximum value/minimum value storage section 12 and outputs the digital value to the host apparatus through the serial interface 50.

Accordingly, the optical transmission control circuit 1 stores and updates the digital value of the A/D conversion result register 32 in the maximum value/minimum value storage section 12. Accordingly, after detecting the digital value crossing the threshold value and outputting an error notification to the host apparatus, if the optical transmission control circuit 1 acquires the digital value crossing the digital value, it updates the maximum value and/or the minimum value, so that it is made possible for the host apparatus to read the digital value based on the updated maximum value and/or the updated minimum value and the more accurate digital value can be provided for the host apparatus.

The optical transmission control circuit 1 generates the flag value requested by the host apparatus using the general purpose register 22 and outputs the flag value to the host apparatus through the output register 51, so that the flag value need not be stored in the optical transmission control circuit 1 and the storage capacity can be reduced. Further, the optical transmission control circuit 1 starts flag generation after inputting the error check request from the host apparatus and thus the contents of the maximum value/minimum value storage section 12 in the most recent state can be reflected on the flag, so that the more accurate flag value can be provided for the host apparatus.

In the embodiment, the flag value is once created in the general purpose register 22 and then is transferred to the output register 51 after the creation termination of the flag value; however, if the flag value is set directly in the output register 51, the operation of transferring the flag value from the general purpose register 22 to the output register 51 can be skipped and the processing can be more speeded up.

The digital value in the maximum value/minimum value storage section 12 usually is reset according to a request made by the host apparatus. This means that the digital value in the maximum value/minimum value storage section 12 is reset as the host apparatus or the operator of the host apparatus outputs a reset request to the optical transmission control circuit 1 after removal of the anomaly cause of the optical transmission control circuit 1 based on the abnormal digital value.

Second Embodiment

Figure 3:
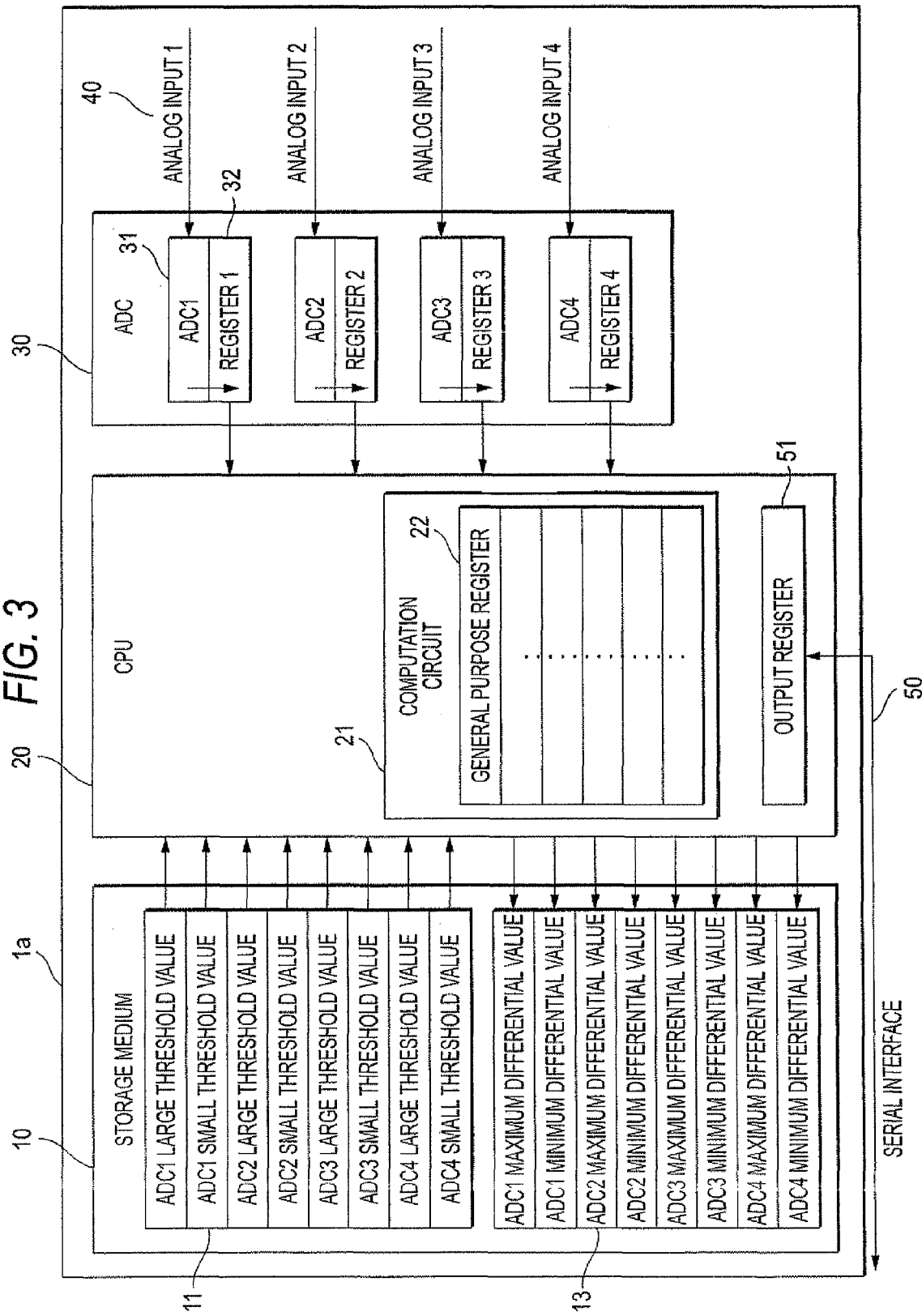
FIG. 3 is a block diagram of an optical transmission control circuit according to a second embodiment of the invention.

FIG. 3 is a block diagram of an optical transmission control circuit according to a second embodiment of the invention. Parts identical with or similar to those previously described with reference to FIG. 1 are denoted by the same reference numerals in FIG. 3 and will not be discussed again. In FIG. 3, numeral 1a denotes an optical transmission control circuit and numeral 13 denotes a maximum differential value/minimum differential value storage section. This maximum differential value/minimum differential value storage section 13 stores the maximum differential value and/or the minimum differential value resulting from making comparison between the digital value acquired from an A/D conversion result register 32 and the corresponding large/small threshold value in a threshold storage section 11.

Next, the operation is as follows: An A/D conversion section 30 converts an input analog signal 40 into a digital value by an A/D conversion circuit 31 and outputs the digital value to the A/D conversion result register 32. On the other hand, a computation circuit 21 makes a comparison between the digital value in the A/D conversion result register 32 and the corresponding large threshold value/small threshold value in the threshold storage section 11 and extracts the differential value therebetween. Next, the computation circuit 21 makes a comparison between the extracted differential value and the corresponding differential value in the maximum differential value/minimum differential value storage section 13 and updates the value in the maximum differential value/minimum differential value storage section 13 if the extracted differential value is larger or smaller than the maximum differential value/minimum differential value.

If the extracted differential value crosses the threshold value, the computation circuit 21 outputs an error signal as an interrupt to a host apparatus. Accordingly, the host apparatus outputs an error check request for acquiring a flag indicating the error cause to the optical transmission control circuit 1a. The optical transmission control circuit la in the invention continues the update operation still after outputting the error signal to the host apparatus.

Figure 4:
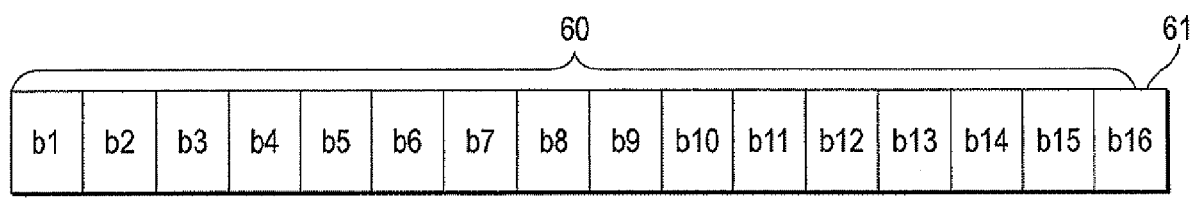
FIG. 4 is a schematic representation of a differential value used in the second embodiment of the invention.

Next, the differential value used in the second embodiment will be discussed. FIG. 4 is a schematic representation of the differential value used in the second embodiment; the differential value is made up of 16 bits by way of example. In the figure, numeral 60 denotes a differential value area and numeral 61 denotes a carry bit area. In the embodiment, the differential value between the digital value in the A/D conversion result register 32 and the corresponding large threshold value/small threshold value in the threshold storage section 11 is input to the differential value area. If the digital value crosses the corresponding large threshold value and/or the corresponding small threshold value in the threshold storage section 11, "1" is set in the carry bit area 61; otherwise, "0" is set. Accordingly, the maximum differential value or the minimum differential value of the differential values is stored in the maximum differential value/minimum differential value storage section 13 in the format in FIG. 4.

Figure 5:
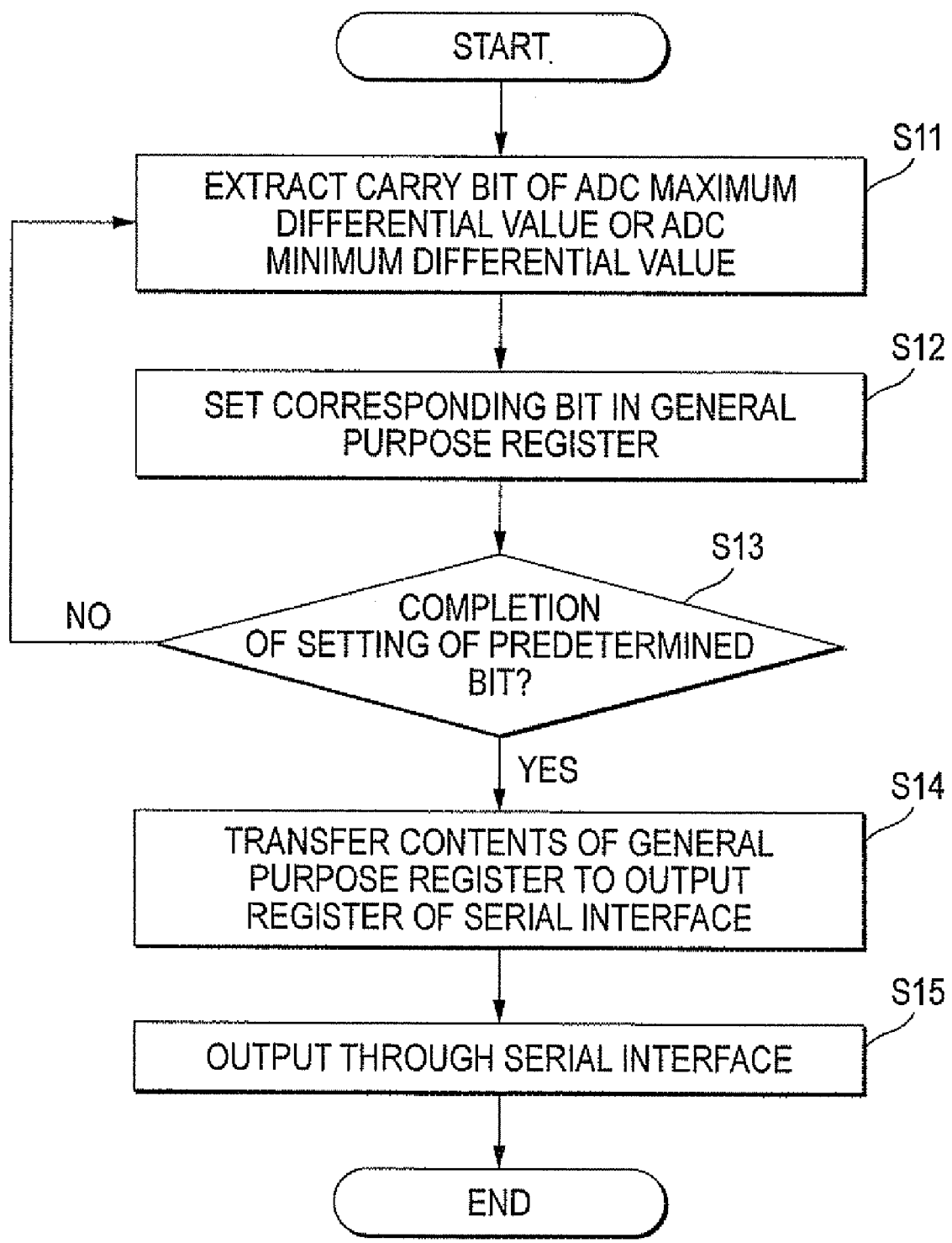
FIG. 5 is a flowchart of processing between a host apparatus and the optical transmission control circuit shown in FIG. 3.

Next, the flag output operation when an error check request is received from the host apparatus will be discussed based on FIG. 5. FIG. 5 is a flowchart of processing between a host apparatus and the optical transmission control circuit la shown in FIG. 3. When the computation circuit 21 inputs an error check request from the host apparatus, it goes to S11 and extracts the carrier bit from the carry bit area 61 in a differential value in the maximum differential value/minimum differential value storage section 13. Next, the computation circuit 21 goes to S12 and sets the extracted carry bit in a predetermined bit of a general purpose register 22 as a flag. Accordingly, if the maximum differential value crosses the large threshold value, the computation circuit 21 sets the bit to "1" indicating a large side anomaly; if the maximum differential value does not cross the large threshold value, the computation circuit 21 sets the bit to "0" indicating large side normality. If the minimum differential value crosses the small threshold value, the computation circuit 21 sets the bit to "1" indicating a small side anomaly; if the minimum differential value does not cross the small threshold value, the computation circuit 21 sets the bit to "0" indicating small side normality and then goes to S13.

Next, at S13, the computation circuit 21 checks whether or not setting of the predetermined flag based on the error check request in the general purpose register 22 is complete. If the setting is complete, the computation circuit 21 goes to S14; otherwise, the computation circuit 21 goes to S11 and sets another flag at S11 and S12. At S14, the computation circuit 21 transfers the contents of the general purpose register 22 where the flag setting is complete to an output register 51. At S15, the computation circuit 21 outputs the contents of the output register 51 to the host apparatus according to a serial interface procedure.

As the above-described operation is performed, the host apparatus inputs the flag set in the output register 51 and analyzes the contents. Then, through a serial interface 50, the host apparatus requests the optical transmission control circuit 1a to send the digital value corresponding to the flag indicating an anomaly according to the flag contents. Accordingly, the computation circuit 21 extracts the differential value corresponding to the digital value requested by the host apparatus from the maximum differential value/minimum differential value storage section 13, converts the extracted differential value into a digital value, and outputs the digital value to the host apparatus through the serial interface 50.

Accordingly, the optical transmission control circuit 1a stores and updates the digital value of the A/D conversion result register 32 in the maximum differential value/minimum differential value storage section 13. Accordingly, after detecting the digital value crossing the threshold value and outputting an error notification to the host apparatus, if the optical transmission control circuit 1a acquires the digital value crossing the digital value, it updates the maximum differential value and/or the minimum differential value, so that it is made possible for the host apparatus to read the digital value based on the updated maximum differential value and/or the updated minimum differential value and the more accurate digital value can be provided for the host apparatus.

The optical transmission control circuit 1a generates the flag value requested by the host apparatus using the general purpose register 22 and outputs the flag value to the host apparatus through the output register 51, so that the flag value need not be stored in the optical transmission control circuit 1a and the storage capacity can be reduced. Further, the optical transmission control circuit 1a starts flag generation after inputting the error check request from the host apparatus and thus the contents of the maximum differential value/minimum differential value storage section 13 in the most recent state can be reflected on the flag, so that the more accurate flag value can be provided for the host apparatus. Since the flag value is set by extracting the carry bit in the carry bit area 61, the flag setting processing can be performed faster.

In the embodiment, the flag value is once created in the general purpose register 22 and then is transferred to the output register 51 after the creation termination of the flag value; however, if the flag value is set directly in the output register 51, the operation of transferring the flag value from the general purpose register 22 to the output register 51 can be skipped and the processing can be more speeded up.

The differential value in the maximum differential value/minimum differential value storage section 13 usually is reset according to a request made by the host apparatus. This means that the digital value in the maximum differential value/minimum differential value storage section 13 is reset as the host apparatus or the operator of the host apparatus outputs a reset request to the optical transmission control circuit 1a after removal of the anomaly cause of the optical transmission control circuit 1a based on the abnormal digital value.

The optical transmission control circuit may be utilized for outputting necessary DDM information to a host apparatus.

What is claimed is:

1. An optical transmission control circuit comprising:
    an analog input section which receives optical transmission states as analog values;
    an A/D conversion section which converts the analog values into digital values;
    a value storage section which stores maximum value of the digital values provided by the A/D conversion section;
    an output register which outputs a value to a host apparatus; and
    a control section which
        controls the value storage section to store the maximum value of the digital values in the value storage section,
        controls the output register to output the maximum value stored in the value storage section to the host apparatus, and
        updates the maximum value stored in the value storage section with a digital value provided by the A/D conversion section when that digital value provided by the A/D conversion section is larger than the maximum value stored in the value storage section.

2. The optical transmission control circuit according to claim 1, further comprising a threshold storage section which stores a threshold value to be compared with the maximum value of the digital values, wherein the control section sets a flag indicating a comparison result between the maximum value of the digital values stored in the value storage section and the threshold value, in a general purpose register, and transfers the flag set, in the general purpose register, to the output register, according to a command from the host apparatus.

3. The optical transmission control circuit according to claim 1, further comprising a threshold storage section which stores a threshold value to be compared with the maximum value of the digital values, wherein the control section sets a flag indicating a comparison result between the maximum value of the digital values stored in the value storage section and the threshold value, in the output register.

4. The optical transmission control circuit according to claim 1, wherein
    the value storage section further stores a minimum value of the digital values provided by the A/D conversion section, and
    the control section controls the value storage section to store the minimum value of the digital values in the value storage section and controls the output register to output the minimum value to the host apparatus.

5. The optical transmission control circuit according to claim 4, further comprising a threshold storage section which stores a small threshold value to be compared with the minimum value of the digital values and a large threshold value to be compared with the maximum value of the digital values, wherein the control section sets a flag indicating either one of comparison results (i) between the maximum value of the digital values stored in the value storage section and the large threshold value and (ii) between the minimum value of the digital values stored in the value storage section and the small threshold value, in a general purpose register, and transfers the flag set, in the general purpose register, to the output register, according to a command from the host apparatus.

6. The optical transmission control section according to claim 4, further comprising a threshold storage section which stores a small threshold value to be compared with the minimum value of the digital values and a large threshold value to be compared with the maximum value of the digital values, wherein the control section sets a flag indicating comparison results (i) between the maximum value of the digital values stored in the value storage section and the large threshold value, and (ii) between the minimum value of the digital values stored in the value storage section and the small threshold value, in the output register, according to a command from the host apparatus.

7. The optical transmission control circuit according to claim 1 further comprising a threshold storage section which stores a threshold value for comparison to the maximum value of the digital values, wherein the control section sets a flag indicating a comparison result between the maximum value of the digital value stored in the value storage section and the threshold value.

8. An optical transmission control circuit comprising:
    an analog input section which receives optical transmission states as analog values;
    an A/D conversion section which converts the analog values into digital values;
    a value storage section which stores a minimum value of the digital values provided by the A/D conversion section;
    an output register which outputs a value to a host apparatus; and
    a control section which
        controls the value storage section to store the minimum value of the digital values in the value storage section,
        controls the output register to output the minimum value to the host apparatus, and
        updates the minimum value stored in the value storage section with a digital value provided by the A/D conversion section when that digital value provided by the A/D conversion section is smaller than the minimum value stored in the value storage section.

9. The optical transmission control circuit according to claim 8, further comprising a threshold storage section which stores a threshold value to be compared with the minimum value of the digital values, wherein the control section sets a flag indicating a comparison result between the minimum value of the digital values stored in the value storage section and the threshold value, in a general purpose register, and transfers the flag set, in the general purpose register, to the output register, according to a command from the host apparatus.

10. The optical transmission control circuit according to claim 8, further comprising a threshold storage section which stores a threshold value to be compared with the minimum value of the digital values, wherein the control section sets a flag indicating a comparison result between the minimum value of the digital values stored in the value storage section and the threshold value, in the output register, according to a command from the host apparatus.

11. The optical transmission control circuit according to claim 8 further comprising a threshold storage section which stores a threshold value for comparison to the minimum value of the digital values, wherein the control section sets a flag indicating a comparison result between the minimum value of the digital value stored in the value storage section and the threshold value.

12. An optical transmission control circuit comprising:
    an analog input section which receives optical transmission states as analog values;
    an A/D conversion section which converts the analog values into digital values;

a differential threshold storage section which stores a large threshold value to be compared with the digital values;
a differential value storage section which stores a maximum differential value that is between the digital values and the large threshold value;
an output register which outputs a value to a host apparatus; and
a control section which
   controls the differential value storage section to store the maximum differential value in the differential value storage section,
   controls the output register to output a maximum value of the digital values, based on the maximum differential value, to the host apparatus, and
   updates the maximum differential value stored in the differential value storage section with a digital value provided by the A/D conversion section when that digital value provided by the A/D conversion section is larger than the maximum differential value stored in the differential value storage section.

13. The optical transmission control circuit according to claim 12, wherein the control section sets a predetermined bit of the maximum differential value stored in the value storage section, in a general purpose register, as a flag, and transfers the flag set, in the general purpose register, to the output register, according to a command from the host apparatus.

14. The optical transmission control circuit according to claim 12, wherein the control section sets a predetermined bit of the maximum differential value stored in the value storage section, in the output register, as a flag, according to a command from the host apparatus.

15. The optical transmission control circuit according to claim 12, wherein
   the differential threshold storage section further stores a small threshold value to be compared with the digital values,
   the differential value storage section further stores a minimum differential value that is between the digital values and the small threshold value, and
   the control section controls the differential value storage section to store the minimum differential value therein and controls the output register to output a minimum value of the digital values, based on the minimum differential value, to the host apparatus.

16. The optical transmission control circuit according to claim 15, wherein the control section sets a predetermined bit of either one of the maximum differential value and the minimum differential value stored in the value storage section, in a general purpose register, as a flag and transfers the flag set, in the general purpose register, to the output register, according to a command from the host apparatus.

17. The optical transmission control circuit according to claim 15, wherein the control section sets a predetermined bit of either one of the maximum differential value and the minimum differential value stored in the value storage section, in the output register, as a flag, according to a command from the host apparatus.

18. An optical transmission control circuit comprising:
an analog input section which receives optical transmission states as analog values;
an A/D conversion section which converts the analog values into digital values;
a differential threshold storage section which stores a threshold value to be compared with the digital values;
a differential value storage section which stores a minimum differential value that is between the digital values and the threshold value;
an output register which outputs a value to a host apparatus; and
a control section which
   controls the differential value storage section to store the minimum differential value in the differential value storage section,
   controls the output register to output a minimum value of the digital values, based on the minimum differential value, to the host apparatus, and
   updates the minimum differential value stored in the differential value storage section with a digital value provided by the A/D conversion section when that digital value provided by the A/D conversion section is smaller than the minimum differential value stored in the differential value storage section.

19. The optical transmission control circuit according to claim 18, wherein the control section sets a predetermined bit of the minimum differential value stored in the value storage section, in a general purpose register, as a flag, and transfers the flag set, in the general purpose register, to the output register, according to a command from the host apparatus.

20. The optical transmission control circuit according to claim 18, wherein the control section sets a predetermined bit of the minimum differential value stored in the value storage section, in the output register, as a flag, according to a command from the host apparatus.

\* \* \* \* \*